May 11, 1954  C. G. ALLANDER ET AL  2,678,237
DEVICE FOR SUPPORTING AND CONVEYING MATERIALS
Filed Sept. 13, 1948  3 Sheets-Sheet 1
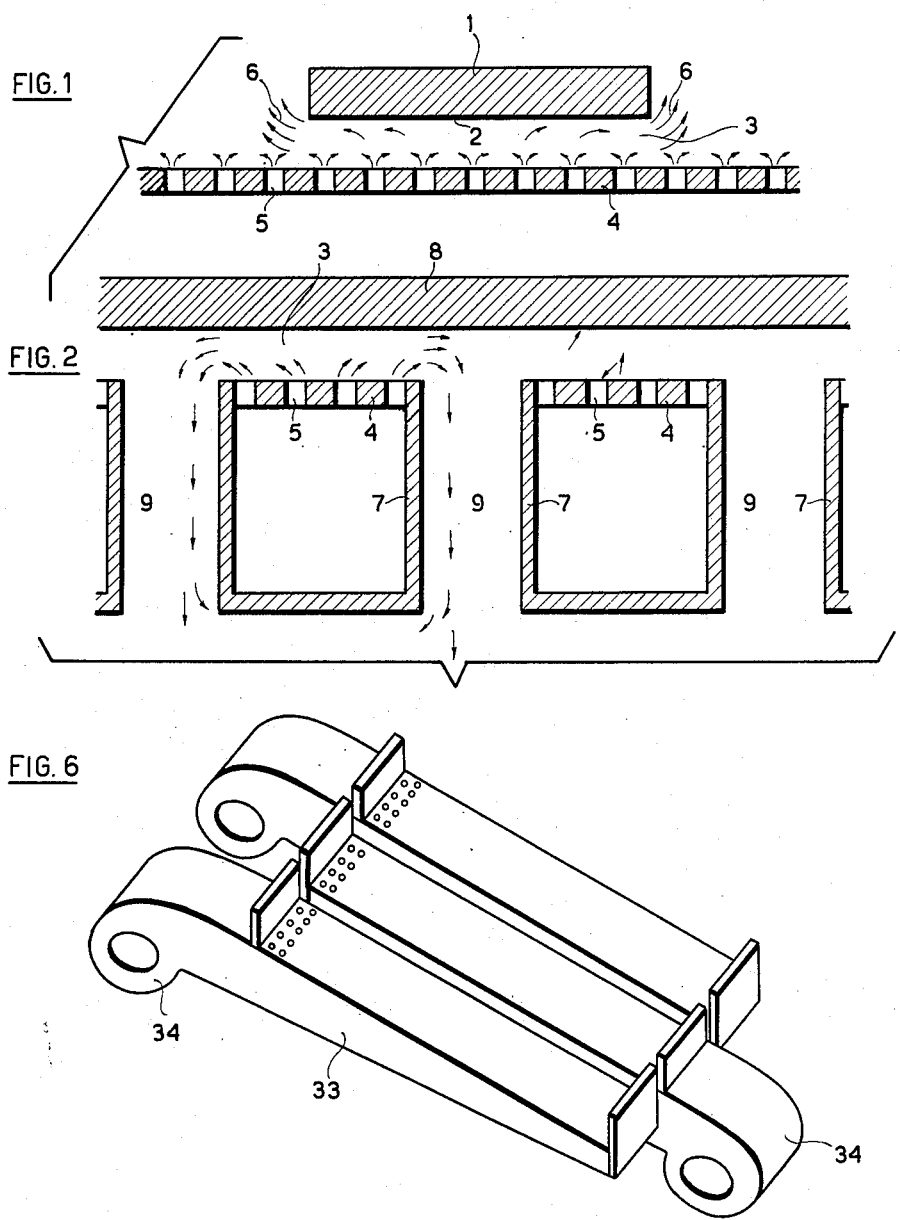
INVENTORS.
CLAES GUSTAF ALLANDER and
SVEN WERNER WALLIN
BY
ATTORNEY

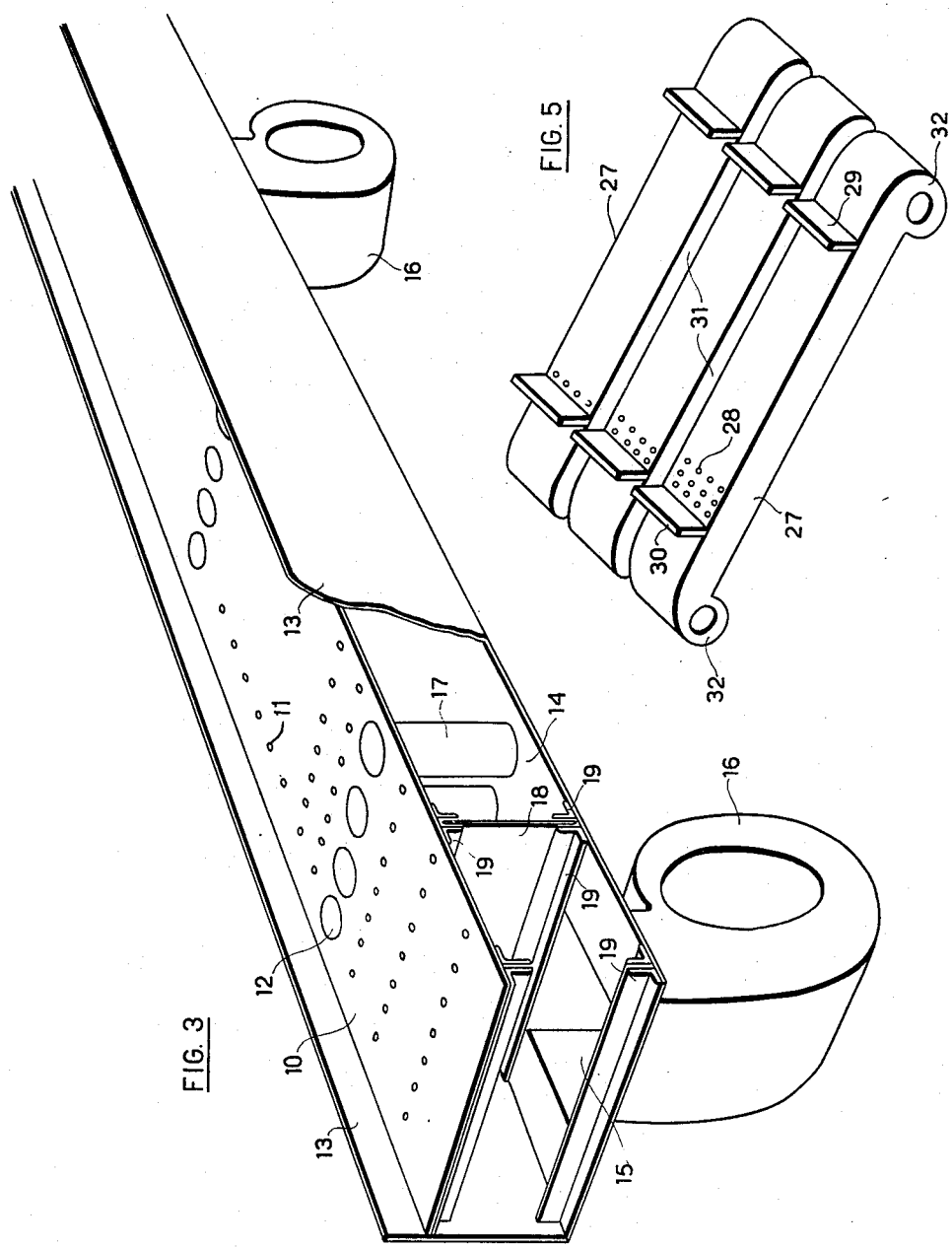

May 11, 1954     C. G. ALLANDER ET AL     2,678,237
DEVICE FOR SUPPORTING AND CONVEYING MATERIALS

Filed Sept. 13, 1948     3 Sheets-Sheet 3

INVENTORS.
CLAES GUSTAF ALLANDER and
SVEN WERNER WALLIN

BY Arthur J. Robert

ATTORNEY

Patented May 11, 1954

2,678,237

UNITED STATES PATENT OFFICE 2,678,237

DEVICE FOR SUPPORTING AND CONVEYING MATERIALS

Claes G. Allander, Lidingo, and Sven W. Wallin, Jonkoping, Sweden, assignors to A. B. Svenska Flakfabriken, Stockholm, Sweden Application September 13, 1948, Serial No. 49,014

9 Claims. (Cl. 302—31)

The present invention relates to a device and a method of supporting and conveying articles having a substantially plane bottom surface over a conveying path provided with penetrating holes, and means for pressing out a pressure medium towards the articles through said holes from below.

The invention is mainly characterized by the fact that the pressure medium is adapted to be pressed out through perforations of the conveying path, which perforations have a small hydraulic diameter, and is evacuated from the space between the conveying path and the articles through channels arranged through the conveying path. Other features characterizing the invention will be seen from the following more detailed description of an embodiment of same.

According to the invention the article or articles are supported by a thin medium-film lying between the conveying path and the articles. The expression "medium" in this case denotes a medium in liquid or gaseous state. In order to make the medium-film carry the article or articles an internal overpressure must be maintained in same, which is effected in that way that fresh pressure medium is continuously supplied, and medium used simultaneously evacuated. If the conveying path is narrow or the articles have a small lower surface the pressure medium may to a sufficient high extent be led away at the sides of the conveying path or around the edges of the articles, but with respect to articles having a large lower surface or regarding conveying paths of great width, e. g. 4-5 meters' width or more, and articles of a band-like material, the overpressure in the film required for the support cannot be maintained unless the medium is supplied to the medium-film through perforations of the conveying path having a small hydraulic diameter, and evacuation of the medium used takes place through outlet channels extending through the conveying path.

The invention is best suited for the transport of plate-like material as for instance sheet metal, lumber, building plates, paper, cellulose webs, fabrics, etc. It may, however, also be used for the conveyance of other objects having a plane or approximately plane lower surface, such as chests, boxes, bricks, building blocks, etc.

It has now been described how the articles are supported by the medium-film. The transport itself occurs in such a manner that the conveying path is made with some degrees' inclination thus making the articles glide on the medium-film along the path. Another way of effecting the transport is to direct the medium jets obliquely towards the articles, so that the jet gives rise to a component of force in the direction of motion, which component drives the articles forwards. These two methods may be combined in order to effect the movement of the articles over the path of transport. In certain cases the same methods may be used in order to delay the movement of the articles at desired places of the conveying path.

The articles mentioned above for the transport have hitherto generally been conveyed on transport bands or roller beds which themselves have been set in motion in the direction of transport. The mechanical structure of such conveyors often comprises a large number of bearings and gearings requiring great costs of maintenance, particularly in case they are located in dusty and damp accommodations. It is thus an object of the present invention to provide conveying means working totally without any mechanically movable engine parts for the transport itself. According to the simplest embodiment of the invention the articles are thus during the transport supported by the mentioned medium-film. The pressure medium consists mainly of air.

Some embodiments of the invention are illustrated in the accompanying drawings by way of example.

Figure 1 shows a cross section of an article to be conveyed over a conveying path provided with holes.

Figure 2 is a vertical longitudinal section through a conveying path according to the invention, in which the perforations for the sake of clearness are shown having a greater diameter than is generally the case.

Figure 3 is a diagrammatic perspective view of part of a conveying device according to the invention, which is partly shown in section.

Figure 2 may be regarded as a vertical longitudinal section through Figure 4.

Figure 5 is a modification of the device according to Figure 4.

Figure 6 is another modification of the device according to Figure 4.

Figure 4:
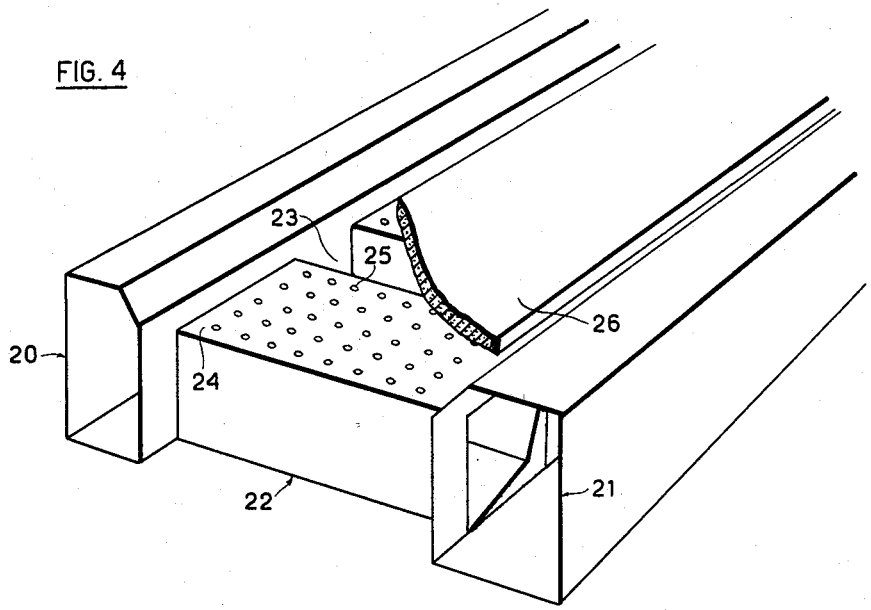
Figure 4 is a perspective view of part of another embodiment of the conveying device according to the invention.

Figure 1 shows in vertical section and on an exaggerated scale an article 1 having a plane lower surface 2 resting on an air film 3 with internal overpressure effected by blowing the air under pressure towards the object 1 from below a conveying path 4 provided with perforations 5 having a small hydraulic diameter. The air flowing through the perforations 5 into the space between the article 1 and the conveying path 4, is evacuated to the surrounding atmosphere by flowing out around the edges of the object 1 in the way as shown by the arrows 6. Fresh air must thus continuously be supplied through the perforations 5 in order that the article 1 may be kept floating on the air film 3. The overpressure of the air film is determined by the weight of the article 1, and its pressure represents the force with which the air is blown out in the direction of the arrows 6. The distance between the upper surface of the path of transport 4 and the lower surface 2 of the article, when the article 1 is kept floating on the air film 3, is called the floating height of the object. In order to make the consumption of air as small as possible it is desirable to keep the floating height small. The factors affecting the floating height are the weight of the object 1, the size of the lower surface 2, the hydraulic diameter of the perforations 5 and their grouping in the path of transport 4, the possibility of evacuating the air from the film between the object 1 and the path of transport 4 as well as the pressure with which the air is blown through the perforations 5.

The weight of the article and size of its lower surface are determined in advance. The pressure with which the air is introduced through the perforation may easily be controlled. These factors may thus be omitted in the following discussion. The more important are the other factors for the invention. It has been found that the perforations must have a small hydraulic diameter and that it must be possible to evacuate the air from the air film through channels extending through the conveying path. Only if these conditions are kept articles of various kinds may be kept floating on a film of air on top of the path of transport.

The channels through the conveying path for the evacuation of air are not required inasfar as the articles are small, i. e. have a small lower surface and are supported by the film of air spaced apart, so that the air to a sufficient degree may be evacuated around the edges of the articles. If articles having a small lower surface are, however, arranged close by one another on the conveying path or if the lower surfaces of the articles are large, particular channels must be arranged in the path of transport for the evacuation of air from the air film.

It is obvious that the perforations must be fairly evenly distributed over the surface of the conveying path. It is particularly convenient to let the sum of the hole area of the perforations of an optionally chosen surface of the conveying path provided with such perforations be smaller than this surface or amount to 50% of same at the utmost. Most conveniently the sum of the hole area will amount to 2–4% of the surface in order to obtain a low floating height and little consumption of air.

If the lower surface of the articles is large or the sum of the lower surfaces of several articles arranged closely together is large, the result will be that the air between the article or articles and the conveying path does not obtain a sufficient outlet area at the edges of the article or articles placed closely together, which outlet area will, however, be controlled by the air itself in such a manner that the article is raised until an equilibrium is obtained or the article is blown away. In the best case an equilibrium with a comparatively great floating height is reached, which is not desirable owing to the fact that this makes the equilibrium of the article or articles unstable. If the object is very flexible it will be bent up at its edges, which is neither desirable, as this may damage the article. In such cases it is of importance that the conveying path is provided with penetrating channels giving the air the possibility to be evacuated from other places than around the edges of the article or articles, as the floating height may in this way be kept down to a low value and the article or articles supported horizontally of a film of air of substantially even thickness.

Figure 2 shows an embodiment of the invention having a conveying path surface and having perforations and channels for the evacuation of air from the air film. The conveying path consists of pressure cases 7 for air being pressed out through the perforations 5 towards the article 8 here shown in longitudinal section and consisting of a paper-web cardboard sheet or the like of 4 meters' width or more. Between the pressure cases 7 there are formed channels 9 extending through and interrupting the conveying path 4 for the evacuation of air from the film of air. The flowing directions of the air are marked by small arrows in the figure.

Figure 3 shows a perspective view of part of a conveying path according to another embodiment of the invention. The conveying path itself is designated by 10, the perforations by 11 and the channels interrupting the conveying path for the evacuation of air by 12. The conveying path is provided with upright side flanges 13 and forms the roof of a long pressure chamber 14, which is supplied with compressed air through the apertures 15 in the bottom plate of the chamber from one or more motor driven fans 16. The channels 12 are formed by tubes 17 extending through the chamber 14 and being solidly secured to the plate 10 of the conveying path and the bottom plate of the chamber 14. The interior of the chamber 14 is divided into smaller chambers separated by means of transversal walls 18. These are controlled by angle irons 19 secured to the interior of the chamber. As will be seen by Figure 3 of the drawing the walls 18 may be moved, so that they will either be located on one side or the other of the apertures 15. The reason for this will be more fully described hereinafter. The channels 12 are in this figure arranged in a transversal row across the path of transport, and in the space between two such rows of channels 12 perforations 11 are provided.

Figure 4 shows still another embodiment of the path of transport according to the invention. Along the path of transport there run two drums 20 and 21 between which there are provided pressure cases 22. The drums 20 and 21 are connected to fans (not shown) delivering compressed air to the drums and thus also to the pressure cases 22. These are arranged in parallel to each other and at such a reciprocal distance that channels 23 are formed between the pressure cases and thus interrupt the conveying path surface for the evacuation of air. The upper surfaces 24 of the pressure cases are provided with perforations 25 and form the conveying path, which is here provided with side supports for the articles in the shape of the upper portions of the drums 20 and 21. The article here conveyed consists of a cellulose web 26.

Figure 5 shows a variation of the embodiment according to Figure 4. In Figure 5 the conveying path is formed by a series of separate pressure cases 27. These are arranged in alignment with one another, so that the upper surfaces of all pressure cases together form the conveying path. Each such upper surface is provided with perforations 28 and projecting side supports 29 and 30 for the articles to be conveyed. Between the pressure cases there have been left slits 31 which interrupt the conveying path surface and form the channels for the evacuation of air from the film of air between the articles and the conveying path. Each pressure case 27 is at each end provided with a fan 32 driven by a motor or the like, which fan delivers air under pressure to the pressure cases 27. The division into separate pressure cases has the advantage of making it easy to exchange these for repair and care and for the change of the conveying path as regards its size and the position of the perforations at any part of the same, if for any reasons it should be desired to change the character of the conveying path as will be more clearly seen by the following.

Figure 6 is still another modification of the embodiment according to Figure 4. Also in this case the conveying path is formed by a series of pressure cases 33 in the same way as according to Figure 5 with slits or elongated transverse channels interrupting the conveying path surface, but here the pressure cases 33 are each provided with only one fan 34 driven in a suitable manner and located at one end of the cases. The cases 33 are arranged in such a way that the fans will be arranged alternately at one side of the conveying path and the other. In this way the fans will be easily accessible for care and repair. However, all fans may be placed at one side of the conveying path.

Figure 7:
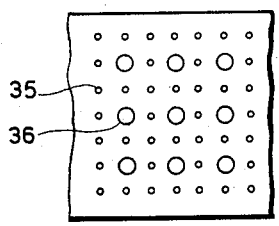
Figure 7 is an elevation of part of a modified embodiment of the conveying path.
Figure 8:
Figure 8 is a vertical section of the conveying path according to Figure 7.

In Figures 7 and 8 there is shown a design for the application of perforations 35 and larger channels 36 interrupting the conveying path surface for the evacuation of air in a conveying path of the type according to Figure 3.

It has now mainly been explained how the articles are supported by the air film on the path of transport. The transport itself of the articles is most easily effected by arranging the conveying path with an inclination of some degrees, thus causing the articles to slide on the air film in the direction of transport. As the friction is very small only little resistance will occur against the transport, and good speed may be obtained. Another way of effecting the transport of the articles is to blow out air jets through the perforations in the direction of transport. The jets will then give rise to a component force in the direction of transport, thus securing the transport. Owing to the little resistance these components need only be comparatively small. The transport may also be effected by the cooperation between these two methods. Sometimes it may be desirable to delay the movement of the articles in the direction of transport, which will then be effected in a corresponding manner by letting the conveying path incline upwards at such a point or by directing the air jets against the direction of transport.

Figure 9:
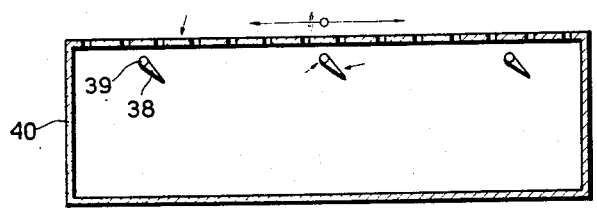
Figure 9 is a vertical cross section of a conveying path according to the invention.

If the direction of transport according to Figure 3 is supposed to be from the left to the right with respect to the objects conveyed, the air blown by means of the foremost fan 16 into the chamber in front of the separating wall 18 will act in such a way that when passing through the perforations 11, said air delays the object during its transport. However, if the separating wall 18 is moved to the other side of the opening 15, the air will flow through the perforations in a direction accelerating the transport of the articles. In both cases the air jets will become more or less obliquely directed when escaping from the perforations. Thus a method will here be provided by which the air may be changed and given a determined direction of current when escaping from the perforations. The holes forming the perforations may in addition be arranged in such a manner that they give the air jets an oblique direction. Other methods of effecting oblique directions of air jets are, for instance, the arrangement of guide rails, plates or tubes at the lower face of the conveying path, these rails, plates or tubes guiding the air through the perforations in a certain direction. In Figure 9 there are shown some examples of rotatable guide rails or guide plates 38 which can be rotated around shafts 39 mounted in the walls of the pressure case 40. These guide plates 38 give the air a lateral direction, but the same plates may also be arranged in the cross-direction of the path of transport for the guidance of the air jets in the longitudinal direction of the path.

During the transport of the articles along the conveying path it sometimes occurs that the objects approach the sides of the path. Therefore the path is provided with side flanges 13 or side supports 29, 30 preventing the objects from sliding down off the path. Such side supports may be substituted by other devices with the same effect. Such a device is the arrangement of the perforations in the conveying path in such a way that the number of perforations is greater at the side edges of the path, whereby the article or articles be raised higher there and slide back and towards the centre of the path on the film of air. Another way is to feed the perforations at the side edges of the path with air of a higher pressure than the rest, this effecting a similar sliding of the articles towards the centre. Finally the conveying path itself may be made in such a manner that its upper surface is somewhat concave in cross section, and in this way the same effect is obtained.

If it is desired to divert the articles from the conveying path in lateral direction, this may easily be effected by first stopping the movement of the articles in any of the above-mentioned ways, and then imparting a new movement to the objects in the desired direction by using any of said methods for effecting the motion (see for instance Figure 9).

The perforations may have any arbitrary form with regard to the holes but a round shape is preferable from a manufacturing point of view. The pressure cases 27 and 33 are generally like each other as regards the size, design and number of perforations, but a number of substituting pressure cases may be provided having perforations of another design, number and size to be used when required in order to obtain another movement of the articles conveyed.

The invention is not limited to the embodiments as described hereinbefore and illustrated in the drawing, but modifications of these embodiments may be considered within the scope of the invention.

Having now described our invention, what we claim as new, and desire to secure by United States Letters Patent, is:

1. In a supporting and conveying apparatus comprising a surface providing a conveying path and having substantially uniformly distributed small apertures therein, and means to force fluid through said apertures to support articles having a lower surface on a fluid cushion in spaced relation to the conveying path surface, the improvement comprising: means providing passages interrupting said conveying path surface between groups of apertures providing a fluid conducting path of larger area than said apertures for escape of fluid from the space between the conveying path surface and the inner portion of the lower surface of articles being transported.

2. An apparatus as specified in claim 1 wherein said means are located at uniform intervals relative to said apertures.

3. An apparatus as specified in claim 1 wherein said means comprise channels elongated transversely of the conveying path surface.

4. An apparatus as specified in claim 3 wherein said conveying path surface comprises the upper walls of a plurality of fluid pressure housings separated by said channels, each housing having means to force fluid through the apertures thereof.

5. An apparatus as specified in claim 1 wherein said conveying path surface comprises the upper wall of a fluid pressure housing, and said means extends through said wall and the opposite wall of the pressure housing.

6. An apparatus as specified in claim 1 wherein said perforate surface comprises the upper wall of a fluid pressure housing having an inlet in the lower wall for admission of fluid under pressure; a removable partition between said walls, and means on opposite sides of said inlet to alternatively receive said partition.

7. An apparatus as specified in claim 1 wherein the combined area of the perforations in the interval between passages constitutes about one forty-ninth to one twenty-fourth of the imperforate surface area in said interval.

8. In apparatus for handling fibrous cement sheets in plastic condition, the combination of a table having a hollow top, the upper surface of the top being formed with a plurality of planar areas containing small perforations, the areas being separated by passages narrower than the areas and extending lengthwise of the table, and means for supplying air beneath the top of the table to escape upwardly through the perforations and float a sheet above the table top, excess air beneath the sheet escaping through the passages.

9. In apparatus for conveying an article having an extensive lower surface over a conveying surface providing a conveying path, said conveying surface having normally open small apertures therethrough substantially uniformly distributed: means supplying fluid to flow through said openings against said article surface at a pressure to constantly maintain said article above and out of contact with the conveying surface; said conveying surface having passages between apertures connecting with the space between said article and conveying surface for escape of fluid from said space intermediate the boundary edges of said article surface, said passages communicating with the atmosphere within said boundary edges.

References Cited in the file of this patent

UNITED STATES PATENTS

| Number | Name | Date |
|---|---|---|
| 544,969 | Dodge | Aug. 20, 1895 |
| 662,574 | McGary | Nov. 27, 1900 |
| 756,600 | Dodge | Apr. 5, 1905 |
| 898,775 | Norton | Sept. 15, 1908 |
| 994,144 | Fowler | June 6, 1911 |
| 2,176,307 | Lamb et al. | Oct. 17, 1939 |
| 2,538,972 | Magnani | Jan. 23, 1951 |